(12) United States Patent
Flower

(10) Patent No.: US 8,727,337 B2
(45) Date of Patent: May 20, 2014

(54) VENDING MACHINE SYSTEM

(76) Inventor: Kenneth F. Flower, Fremont, OH (US)

( * ) Notice: Subject to any disclaimer, the term of this patent is extended or adjusted under 35 U.S.C. 154(b) by 236 days.

(21) Appl. No.: 13/314,605

(22) Filed: Dec. 8, 2011

(65) Prior Publication Data

US 2012/0152971 A1  Jun. 21, 2012

Related U.S. Application Data

(60) Provisional application No. 61/424,234, filed on Dec. 17, 2010.

(51) Int. Cl.
*G07F 11/16* (2006.01)
*G07F 11/22* (2006.01)

(52) U.S. Cl.
USPC ............. 271/99; 221/258; 221/197; 221/210; 221/259; 221/232; 221/226; 221/248; 221/230; 221/277; 221/213; 221/217; 221/138; 221/135; 221/131; 271/131; 271/258; 271/241; 271/259

(58) Field of Classification Search
CPC ........ B65H 3/122; B65H 3/085; G07F 11/16; G07F 11/22
USPC ......... 221/258, 197, 210, 259, 226, 232, 248, 221/230, 277, 213, 217, 138, 135, 131; 271/99, 131, 258, 241, 242, 259
See application file for complete search history.

(56) References Cited

U.S. PATENT DOCUMENTS

| | | | |
|---|---|---|---|
| 3,446,396 A | | 5/1969 | Gasiel et al. |
| 3,833,148 A | * | 9/1974 | Honas ............................ 221/250 |
| 4,603,792 A | * | 8/1986 | Molineux ........................ 221/96 |
| 4,657,236 A | * | 4/1987 | Hirakawa et al. ............... 271/99 |
| 4,865,222 A | * | 9/1989 | Sullivan ......................... 221/241 |
| 5,127,546 A | * | 7/1992 | Chen .............................. 221/242 |
| 5,335,822 A | * | 8/1994 | Kasper ........................... 221/259 |
| 5,422,078 A | * | 6/1995 | Colon ............................ 422/123 |
| 5,439,136 A | * | 8/1995 | Chatani et al. ................. 221/258 |
| 5,454,203 A | * | 10/1995 | Turner ............................. 52/831 |
| 5,464,203 A | * | 11/1995 | Bowser et al. .................. 271/12 |
| 5,476,190 A | * | 12/1995 | Herrmann et al. ............. 221/197 |
| 5,842,598 A | * | 12/1998 | Tsuchida ....................... 221/258 |
| 5,941,414 A | * | 8/1999 | Kasper ........................... 221/210 |
| 2012/0152971 A1 | * | 6/2012 | Flower ............................... 221/1 |

* cited by examiner

*Primary Examiner* — Gene Crawford
*Assistant Examiner* — Rakesh Kumar
(74) *Attorney, Agent, or Firm* — Fraser, Clemens, Martin & Miller LLC; Jacob M. Ward

(57) ABSTRACT

A vending machine system for stackable goods such as vehicle air fresheners includes a hopper and a reciprocating arm. The hopper is configured to hold a stack of the stackable goods. The hopper has an aperture formed in a base of the hopper for dispensing the stackable goods from the hopper. The reciprocating arm is disposed adjacent the aperture. The reciprocating arm is linearly movable between a retracted position and an extended position. One of the stackable goods is received by the reciprocating arm when the reciprocating arm is in the retracted position, and is pushed from the stack of stackable goods by the reciprocating arm when the reciprocating arm is in the extended position.

14 Claims, 4 Drawing Sheets

VENDING MACHINE SYSTEM

CROSS-REFERENCE TO RELATED APPLICATIONS

This application claims the benefit of U.S. Provisional Application No. 61/424,234, filed on Dec. 17, 2010. The entire disclosure of the above application is hereby incorporated herein by reference.

FIELD OF THE INVENTION

The present disclosure relates to a vending machine system and, more particularly, to a vending machine system for vehicle air fresheners.

BACKGROUND OF THE INVENTION

Vending machine systems are well known in the art for distribution of products such as snacks, beverages, lottery tickets, and other goods to consumers without a cashier. One type of vending machine system is often found at vehicle washing facilities such as automatic and self-serve car washes, and distributes vehicle air fresheners to vehicle owners upon payment of a fee.

A known vending machine system is described in U.S. Pat. No. 3,446,396 to Gasiel et al., the entire disclosure of which is hereby incorporated herein by reference. Gasiel et al. describes a drop-shelf system having a lever mechanism that is pivotally attached to a vertically moving reset bar that engages protrusions on edges of individual shelves, thereby enabling the shelves to be raised to a horizontal reset position in a single operation.

Conventional vending machine systems have many moving parts, which are often prone to mechanical failure. This results in undesirable maintenance issues during the operating lifetime of the conventional vending machine systems. Certain vending machine systems such as drop-shelf systems also have a considerable amount of unused space, even when fully loaded with product.

There is a continuing need for a vending machine system that has fewer moving parts and requires less maintenance during the operating lifetime of the vending machine system. Desirably, the vending machine system also permits the loading of significantly more product than conventional vending machine systems.

SUMMARY OF THE INVENTION

In concordance with the instant disclosure, a vending machine system that has fewer moving parts, requires less maintenance during the operating lifetime of the vending machine system, and permits the loading of significantly more product than conventional vending machine systems, is surprisingly discovered.

In one embodiment, a vending machine system for stackable goods includes a hopper and a reciprocating arm. The hopper is configured to hold a stack of the stackable goods. The hopper has an aperture formed in a base of the hopper for dispensing the stackable goods from the hopper. The reciprocating arm is disposed adjacent the aperture. The reciprocating arm is linearly movable between a retracted position and an extended position. One of the stackable goods is received by the reciprocating arm when the reciprocating arm is in the retracted position, and is pushed from the stack of stackable goods by the reciprocating arm when the reciprocating arm is in the extended position.

In a further embodiment, the vending machine system dispenses vehicle air fresheners.

In another embodiment, a method for vending stackable goods includes the steps of providing the vending machine system and causing the reciprocating arm to move from the retracted position to the extended position. The vehicle air fresheners are thereby dispensed from the vending machine system.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
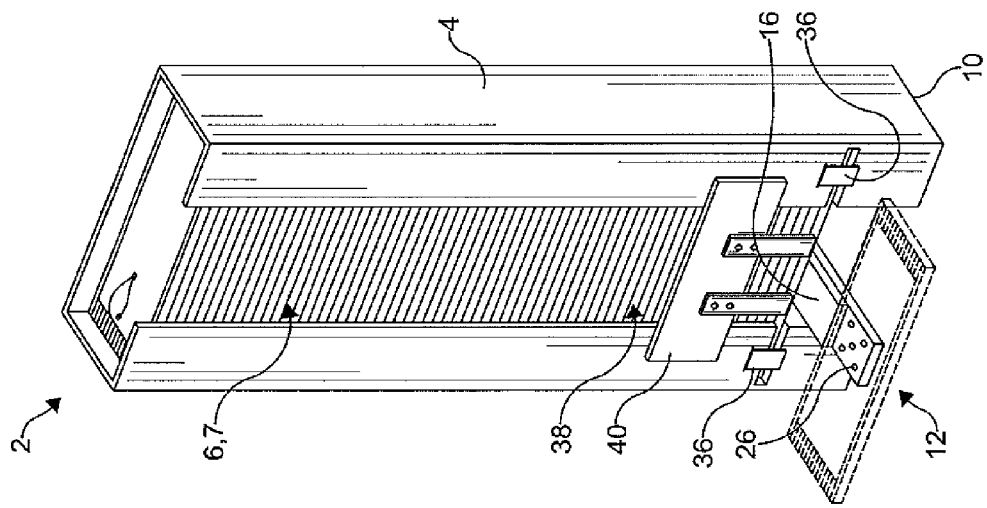
FIGS. 1-3 are front perspective views of a vending machine system according to one embodiment of the present disclosure, showing a stepwise operation of the vending machine system, with a dispensed one of a stack of goods illustrated in dashed lines in FIG. 3 so that an underlying reciprocating arm is shown.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

As shown in FIGS. 1-11, the present disclosure includes a vending machine system 2. The vending machine system 2 has a hopper 4. The hopper 4 is configured to hold a plurality of vehicle air fresheners 6 disposed in a stack 7. The hopper 4 has an aperture 8. The aperture 8 is formed in a base 10 of the hopper 4 for dispensing the vehicle air fresheners 6 from the hopper 4.

The vehicle air fresheners 6 may be provided in the form of individual packages. The filled packages may form the stack 7 of vehicle air fresheners 6. As nonlimiting examples, the vehicle air fresheners 6 may be packaged in lap seal packaging or fin seal packaging. It should be appreciated that, while lap seal packages may be preferred, fin seal packages may also be employed if properly oriented in the vending machine system 2. Other packaging types may also be used with the vending machine system 2, as desired.

Although the invention is described herein with respect to vehicle air fresheners 6, it should be understood that the vending of other substantially planar, stackable goods capable of being disposed in the stack 7 such as cards, written materials, and the like, is also within the scope of the present disclosure.

Figure 2:
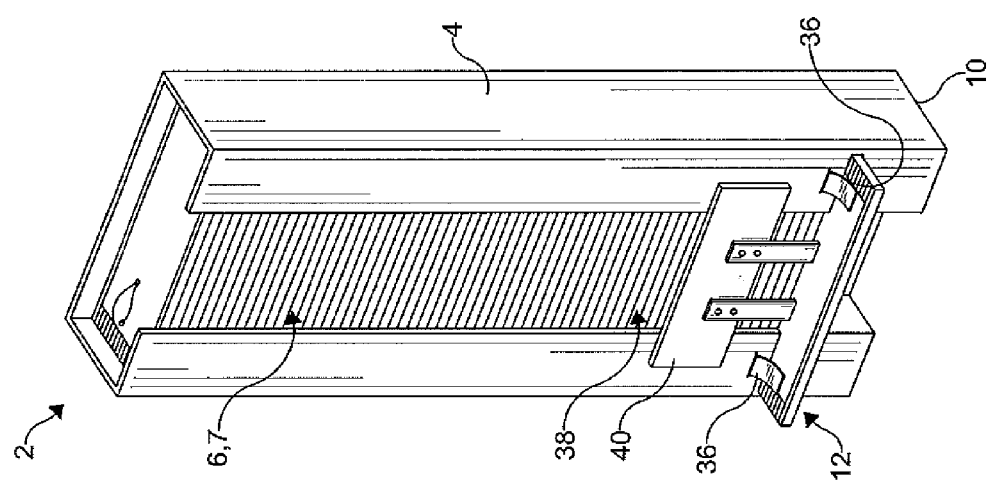
Figure 3:
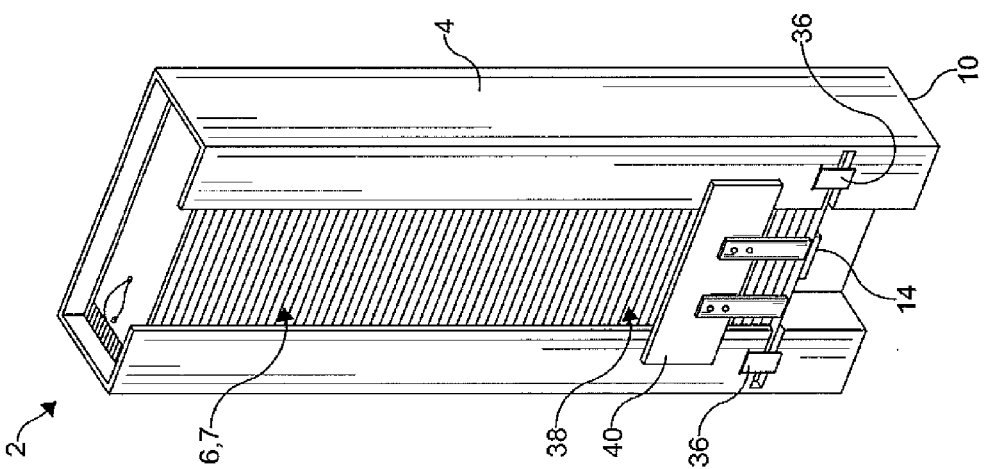
Figure 4:
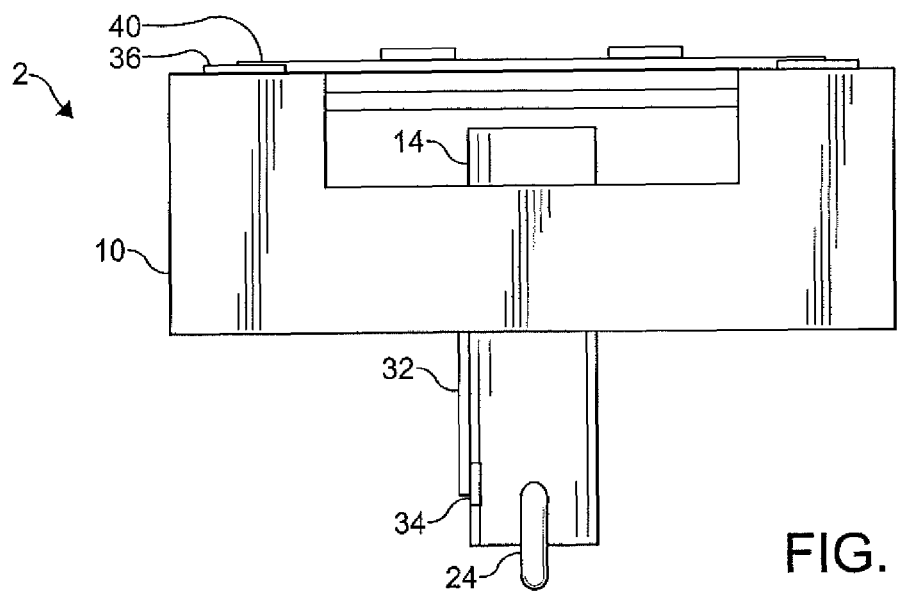
FIGS. 4-6 are bottom plan views of the vending machine system depicted in FIGS. 1-3, showing the stepwise operation of the vending machine system.
Figure 5:
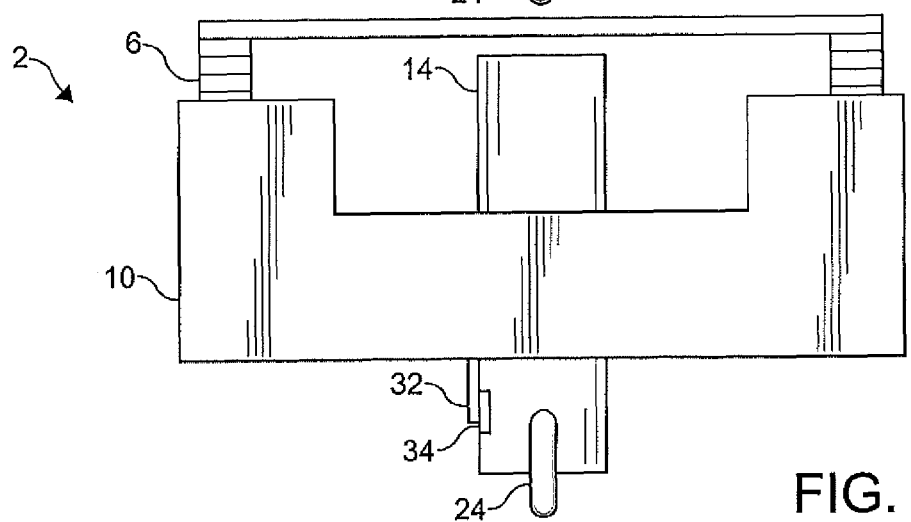
Figure 6:
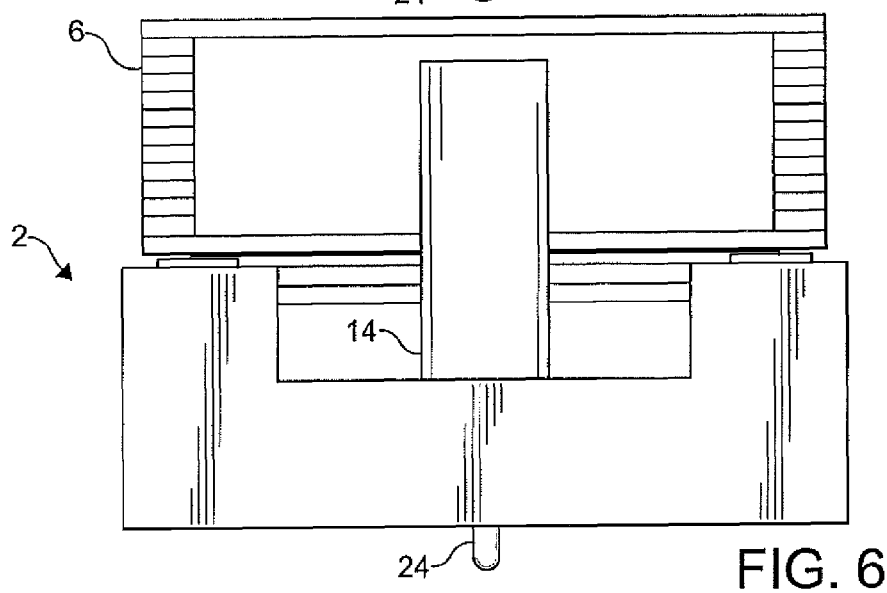
Figure 7:
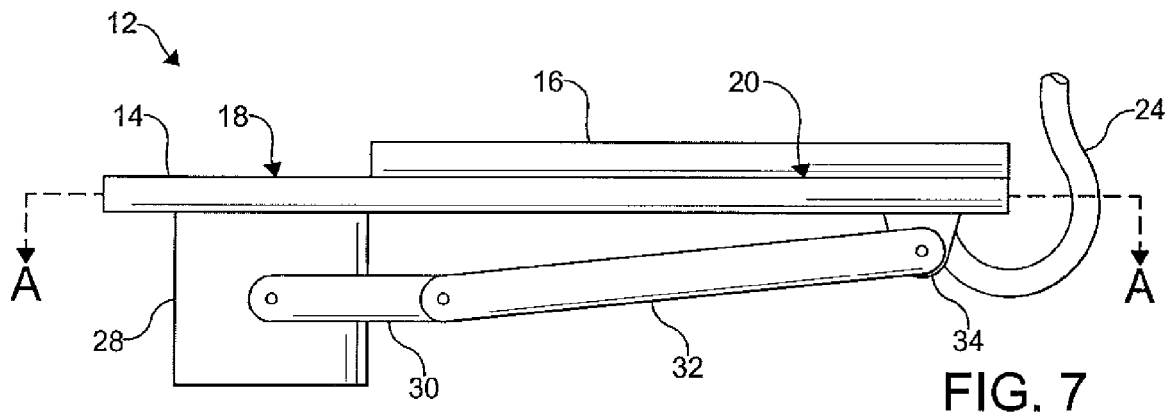
FIGS. 7-9 are side elevational views of a reciprocating vacuum arm assembly of the vending machine system depicted in FIGS. 1-6, showing the stepwise operation of the reciprocating vacuum arm assembly.

The vending machine system 2 also includes a reciprocating arm 12 disposed adjacent the aperture 8. The reciprocating arm 12 is linearly movable between a retracted position and an extended position. For example, the reciprocating arm 12 may be disposed in a linear guide (not shown) such as a lubricated rail, bearings, or the like that permits only a back-and-forth linear movement of the reciprocating arm 21. As illustrated in FIGS. 1, 4, and 7, the reciprocating arm 12 in the retracted position is disposed beneath the stack 7. The reciprocating arm 12 in the extended position, shown in FIGS. 3, 6, and 9, is disposed laterally outwardly from the aperture 8 formed in the base 10 of the hopper 4. An intermediate position between the retracted position and the extended position is depicted in FIGS. 2, 5, and 8.

In operation, one of the vehicle air fresheners 6 at a bottom of the stack 7 is received by the reciprocating arm 12 when the reciprocating arm 12 is in the retracted position. The same one of the vehicle air fresheners 6 is then pushed from the stack 7 of vehicle air fresheners 6 by the reciprocating arm 12 when the reciprocating arm 12 is in the extended position. The remaining vehicle air fresheners 6 in the hopper 4 are typically advanced downward in the stack 7 under the influence of gravity, after the bottom-most vehicle air freshener 6 has been removed by operation of the reciprocating arm 12. The advancement of vehicle air fresheners 6 in the stack 7 may also be facilitated by other means such as a weight or a biasing mechanism, for example, a coiled spring, placed at a top of the stack 7.

Figure 8:
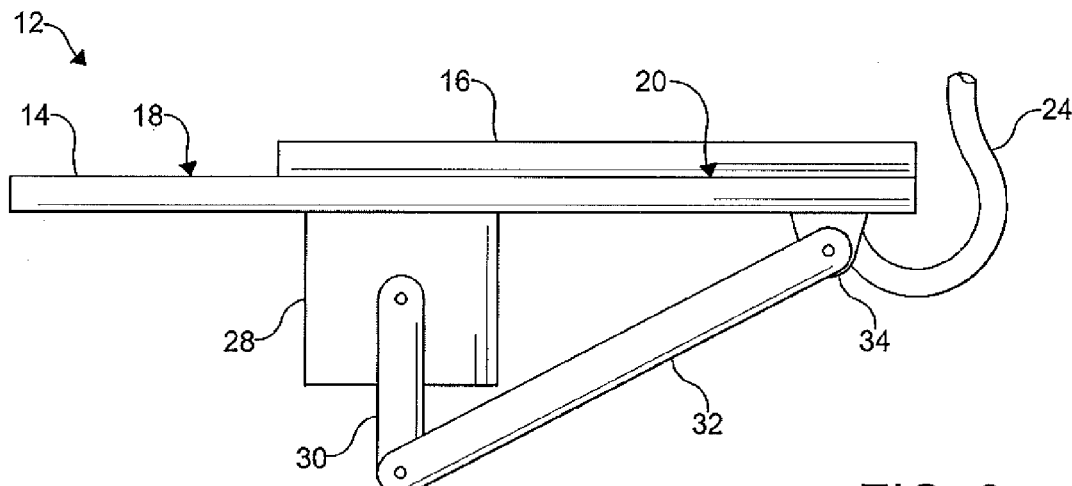
Figure 9:
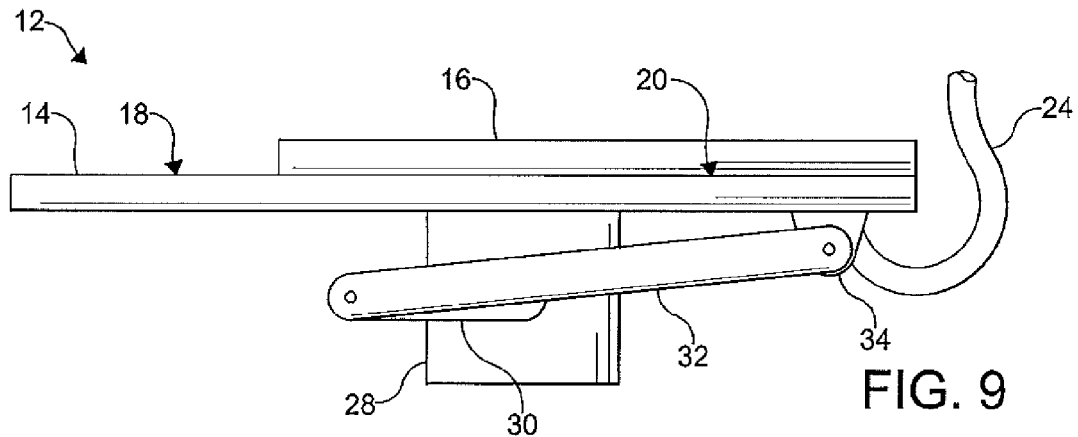

With reference to FIGS. 7-9, the reciprocating arm 12 may include a base plate 14 and a pusher plate 16. The base plate 14 has a first portion 18 and a second portion 20. The first portion 18 of the base plate 14 is exposed, and is configured to receive one of the vehicle air fresheners 6 when the reciprocating arm 12 is in the retracted position. The pusher plate 16 covers the second portion 20 of the base plate 14. The pusher plate 16 is configured to push one of the vehicle air fresheners 6 from the stack 7 of vehicle air fresheners 6 when the reciprocating arm 12 is moved from the retracted position to the extended position.

In an alternative embodiment, the reciprocating arm 12 is a single unitary member with the second portion 20 being raised and functioning as the pusher plate 16. Other configurations or designs permitting the reciprocating arm 12 to selectively push one of the vehicle air fresheners 6 from the stack 7 of vehicle air fresheners 6 are also within the scope of the present disclosure.

Figure 10:
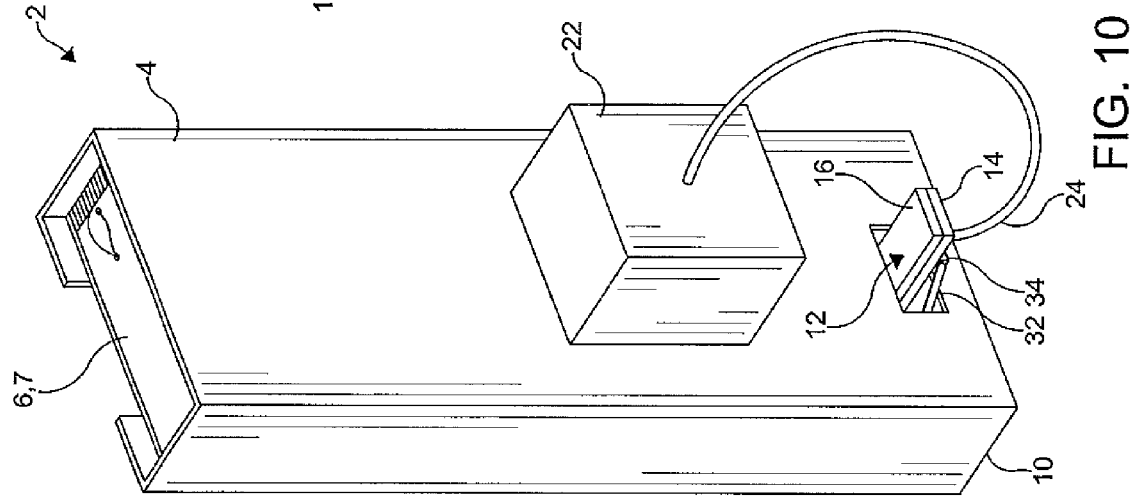
FIG. 10 is a rear perspective view of the vending machine system depicted in FIGS. 1-9.

Referring now to FIG. 10, the vending machine system 2 may further including a vacuum generator 22. The vacuum generator 22 is configured to create a vacuum at the first portion 18 of the reciprocating arm 12. The vacuum generator may be one of a venturi vacuum device and a vacuum motor, as nonlimiting examples. Other means for generating a vacuum may also be employed, as desired.

Figure 11:
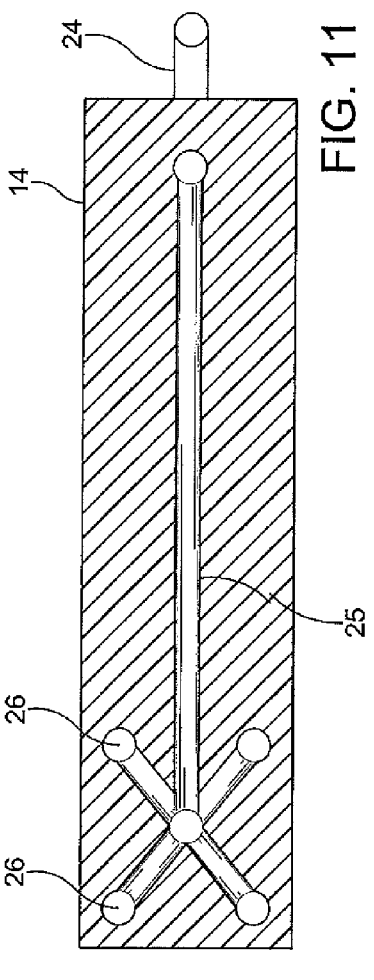
FIG. 11 is a cross-sectional top plan view of the reciprocating vacuum arm assembly taken along section line A-A in FIG. 7.

In one embodiment, the vacuum generator 22 is in communication with the first portion 18 of the reciprocating arm 12. For example, the vacuum generator 22 may be disposed at a rear of the hopper 4 and be placed in communication with the reciprocating arm 12 via a flexible vacuum hose 24. As shown in FIG. 11, the base plate 14 of the reciprocating arm 12 may have an internal conduit 25 in communication with the vacuum hose 24. The base plate 14 may also have at least one suction hole 26 formed in the first portion 18 and in communication with the internal conduit 25. Although the internal conduit 25 is shown in FIG. 11 being in primary communication with a central one of a plurality of the suction holes 26, the other ones of the suction holes 26 being in communication with the primary one of the suction holes 26, other configurations suitable for creating a vacuum at each suction hole 26 may also be employed within the scope of the disclosure.

A width of the base plate 14 in which the suction holes 26 are formed may also be selected to provide an optimized surface area for contact with the vehicle air fresheners 6 to be dispensed. At least one suction hole 26 is configured to selectively hold one of the vehicle air fresheners 6 against the first portion 18 of the reciprocating arm 12 when the vacuum generator 22 creates the vacuum.

The vacuum generator 22 may create a constant or an intermittent vacuum, as desired. In particular embodiments, the vacuum created is intermittent. For example, where the dispensing of a vehicle air freshener 6 is requested by a customer, the vacuum generator 22 may "spool up" in order that the bottom-most vehicle air freshener 6 in the stack may be drawn to the reciprocating arm 12 in the retracted position. Where the reciprocating arm 12 has been moved to the extended position, the vacuum generator 22 may cease operation in order to permit the customer to take the vehicle air freshener 6 from the reciprocating arm 12. The operation of the vacuum generator 22 may be controlled by a timing device (not shown), for example, which causes the vacuum generator 22 to create the vacuum for a predetermined period of time following the request for the vehicle air freshener 6 by the customer.

The vacuum created by the vacuum generator 22 is sufficient to draw and secure the vehicle air freshener 6 to the reciprocating arm 22. One of ordinary skill may select a suitable range for the vacuum created by the vacuum generator 22, as desired.

The employment of the vacuum generator 22 advantageously contributes to a consistency in operation of the vending machine system 2. For example, where one of the vehicle air fresheners 6 is warped and would otherwise catch on an edge of the aperture 8, the vacuum generator 22 draws the vehicle air freshener 6 flatly against the reciprocating arm 22 and permits the same to be dispensed through the aperture 8. An improper vending of the vehicle air freshener 6 is thereby militated against.

With renewed reference to FIGS. 7-9, it should be understood that the reciprocating arm 12 of the present disclosure is linearly movable in order to retrieve and dispense individual vehicle air fresheners 6 stacked in the hopper 4. As a non-limiting example, the reciprocating arm 12 may be actuated by a gear motor 28. The gear motor 28 may be connected to the reciprocating arm 12 via a first elongate member 30 and a second elongate member 32, for example. The first elongate member 30 is connected to an axle of the gear motor 28 and may be rotated by the same. The first elongate member 30 is connected to one end of the second elongate member 32, and causes both a vertical and a lateral movement of the second elongate member 32 as the first elongate member 30 is rotated by the gear motor 28.

Another end of the second elongate member 32 is connected to the reciprocating arm 12, for example, with a bracket 34 and causes only a lateral movement of the reciprocating arm 12. In operation, a full rotation of the axle of the gear motor 28 results in a movement of the reciprocating arm 12 from the retracted position (shown in FIG. 7), through the intermediate position (shown in FIG. 8), to the extended position (shown in FIG. 9), and back to the retracted position. Other means for linearly moving the reciprocating arm 12 such as a servo motor, linear actuator, belt-based actuator, and a screw-based actuator may also be employed, as desired.

With renewed reference to FIGS. 1-3, the vending machine system 2 may also include at least one holding member 36.

The holding member 36 is disposed adjacent the base 10 of the hopper 4. The holding member 36 permits one of the vehicle air fresheners 6 to be linearly dispensed from the hopper 4 through the aperture 8. The holding member 36 also desirably militates against a pulling of a dispensed one of the vehicle air fresheners 6 back through the aperture 8 as the reciprocating arm 12 retracts.

In certain embodiments, the holding member 36 is a hinged tab that is movable outwardly from the hopper 4 and not movable rearwardly from a resting position adjacent the hopper 4. In other embodiments, the holding member 36 is a thin metal sheet spring. For example, as shown in FIG. 2, the thin metal sheet spring yields under the force caused by the pushing of the vehicle air freshener 6 by the reciprocating arm 12 as the reciprocating arm 12 extends, but does not yield when the reciprocating arm 12 retracts.

In further embodiments, the holding member 36 may be a spring-biased element having a beveled edge facing the aperture 8. Other means for militating against the pulling of the vehicle air freshener 6 back through the aperture 8 after dispensing the vehicle air freshener 6 are also within the scope of the present disclosure.

As shown in FIGS. 1-3, the hopper 4 of the vending machine system 2 may also have an open front 38 and a height-adjustable stack retention member 40. The height-adjustable stack retention member 40 secures the stack 7 within the hopper, and permits only one vehicle air freshener 6 from the stack to be vended when the reciprocating arm 12 moves from the retracted position to the extended position.

The vending machine system 2 may also include a fullness or level indicator (not shown) for communicating to an operator of the vending machine system 2 the quantity of vehicle air fresheners 6 remaining in the vending machine system 2. For example, the level indicator may provide a signal to a computer for communicating to the operator the remaining quantity of vehicle air fresheners 6. The signal may be provided through a wired connection, or wirelessly, for example. The signal may be provided to a server accessible by the operator's computer via the Internet, as another example. Other means for communicating the remaining quantity of vehicle air fresheners 6 may also be used.

It should be understood that the vending machine system 2 of the present disclosure may include a variety of other features common to conventional vending machines. For example, the vending machine system 2 will include an interface (not shown). The interface may be a push-button interface or other type of interface as is known in the art. The interface permits the customer to select the desired type and quantity of the vehicle air freshener 6, and to pay for the vehicle air freshener 6 at the vending machine system 2.

As a further example, the vending machine system 2 will include a payment device for receiving payment by coinage, cash money, or credit/debit card. Where the payment device is configured to receive coinage and cash money, the payment device may include an anti-theft vault system (not shown) that is built into the vending machine system 2 for secure storage of the coinage and cash money. Alternatively, the vending machine system 2 may be configurable for use with a preexisting vault system, for example, by way of a knockout formed in a wall of the vending machine system 2 that is placed in communication with the preexisting vault system via a pipe or other conduit.

The present disclosure further includes a method for vending vehicle air fresheners 6 from the vending machine system 2. The method includes the steps of providing the vending machine system 2 as disclosed hereinabove, and causing the reciprocating arm 12 to move from the retracted position to the extended position to dispense one of the vehicle air fresheners 6 from the stack 7.

In a particular embodiment, the method for dispensing the vehicle air fresheners from the vending machine system 2 includes the steps of: providing the reciprocating arm 12 in the retracted position with the vacuum being created by the vacuum generator 22; permitting a customer to select one of the vehicle air fresheners 6; causing the reciprocating arm 12 to move to the extended position, wherein one of the vehicle air fresheners 6 is pushed from the bottom of the stack 7; ceasing the creation of the vacuum after the reciprocating arm 12 has reached the extended position, wherein the reciprocating arm 12 retracts, causing the freshener 6 to make contact with the hinged holding member 36, allowing the freshener 6 to drop by cause of gravity to a retrieval slot so that the customer may receive the freshener 6. At that point, the reciprocating arm 12 is ready for an additional dispensing of the vehicle air freshener 6 from the stack 7.

A plurality of the vending machine systems 2 of the present disclosure may be employed as part of a single unit installed at a vehicle washing facility. Vending machine systems 2 having one (1), three (3), and five (5) of the stacks 7 with different types of the vehicle air fresheners 6 are within the scope of the present disclosure, although a skilled artisan understands that other quantities of the stacks 7 may also be used.

Advantageously, the vending machine system 2 disclosed herein permits the loading of significantly greater quantities of the vehicle air freshener 2, for example, up to ten-times the amount typically associated with known drop-shelf vending machine systems. Due to the simplicity of the present vending machine system 2, it is also expected that the vending machine system 2 will experience fewer instances of mechanical failure during the operating lifetime of the vending machine system 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A vending machine system for stackable goods, comprising:
a hopper configured to hold a stack of the stackable goods, the hopper having an aperture formed in a base of the hopper for dispensing the stackable goods from the hopper;
a vacuum generator;
a reciprocating arm disposed adjacent the aperture, the reciprocating arm linearly movable between a retracted position and an extended position, one of the stackable goods received by the reciprocating arm when the reciprocating arm is in the retracted position and pushed from the stack of stackable goods by the reciprocating arm when the reciprocating arm is moved to the extended position; and
a pair of holding members disposed on the hopper, one of the holding members disposed adjacent a first side of the reciprocating arm and another of the holding members disposed adjacent a second side of the reciprocating arm, the first side of the reciprocating arm disposed opposite the second side of the reciprocating arm, the holding members each extending over a minor portion of the aperture formed in the base of the hopper, the holding members permitting one of the stackable goods to be linearly dispensed from the hopper and militating against a pulling of the one of the stackable goods back through the aperture as the reciprocating arm retracts, wherein the reciprocating arm includes a base plate and a pusher plate, the base plate having an uppermost major surface, the major surface having a first portion and a second portion, the pusher plate covering and abutting the second portion of the major surface, the first portion of the major surface configured to receive the one of the stackable goods when the reciprocating arm is in the retracted position, and the pusher plate configured to push the one of the stackable goods from the stack of stackable goods when the reciprocating arm is moved to the extended position, wherein the base plate has an internal conduit in communication with at least one suction hole of the base plate, the at least one suction hole formed in the base plate in only the first portion of the major surface, the pusher plate disposed above the internal conduit, and wherein the vacuum generator is in communication with the first portion of the major surface of the base plate via the internal conduit and the at least one suction hole and configured to create a vacuum at the first portion of the major surface of the base plate.

2. The vending machine system of claim 1, wherein the stackable goods are vehicle air fresheners.

3. The vending machine system of claim 1, wherein the vacuum generator is in communication with the first portion of the major surface of the base plate with a flexible vacuum hose.

4. The vending machine system of claim 1, wherein the holding members are hinged tabs.

5. The vending machine system of claim 1, wherein the holding members are thin metal sheet springs.

6. The vending machine system of claim 1, wherein the hopper has an open front and a height-adjustable stack retention member.

7. The vending machine system of claim 1, further comprising a gear motor for moving the reciprocating arm between the retracted position and the extended position, the gear motor connected to the reciprocating arm via a first elongate member and a second elongate member, wherein the first elongate member is directly connected to an axle of the gear motor and rotatably connected to one end of the second elongate member, and another end of the second elongate member is rotatably connected to the reciprocating arm.

8. The vending machine system of claim 7, wherein the gear motor causes both a vertical and a lateral movement of the second elongate member as the first elongate member is rotated by the gear motor.

9. A vending machine system for vehicle air fresheners, comprising:
a hopper configured to hold a stack of the vehicle air fresheners, the hopper having an aperture formed in a base of the hopper for dispensing the vehicle air fresheners from the hopper;
a vacuum generator;
a reciprocating arm disposed adjacent the aperture, the reciprocating arm linearly movable between a retracted position and an extended position, one of the vehicle air fresheners received by the reciprocating arm when the reciprocating arm is in the retracted position and pushed from the stack of vehicle air fresheners by the reciprocating arm when the reciprocating arm is moved to the extended position; and
a pair of holding members disposed on the hopper, one of the holding members disposed adjacent a first side of the reciprocating arm and another of the holding members disposed adjacent a second side of the reciprocating arm, the first side of the reciprocating arm disposed opposite the second side of the reciprocating arm, the holding members each extending over a minor portion of the aperture formed in the base of the hopper, the holding members permitting one of the stackable goods to be linearly dispensed from the hopper and militating against a pulling of the one of the vehicle air fresheners back through the aperture as the reciprocating arm retracts, wherein the reciprocating arm includes a base plate and a pusher plate, the base plate having an uppermost major surface, the major surface having a first portion and a second portion, the pusher plate covering and abutting the second portion of the major surface, the first portion of the major surface configured to receive the one of the stackable goods when the reciprocating arm is in the retracted position, and the pusher plate configured to push the one of the vehicle air fresheners from the stack of vehicle air fresheners when the reciprocating arm is moved to the extended position, wherein the base plate has an internal conduit in communication with at least one suction hole of the base plate, the at least one suction hole formed in the base plate in only the first portion of the major surface, the pusher plate disposed above the internal conduit, and wherein the vacuum generator is in communication with the first portion of the major surface of the base plate via the internal conduit and the at least one suction hole and configured to create a vacuum at the first portion of the major surface of the base plate.

10. The vending machine system of claim 9, further comprising a gear motor for moving the reciprocating arm between the retracted position and the extended position, the gear motor connected to the reciprocating arm via a first elongate member and a second elongate member, wherein the first elongate member is directly connected to an axle of the gear motor and rotatably connected to one end of the second elongate member, and another end of the second elongate member is rotatably connected to the reciprocating arm.

11. A method for vending stackable goods, the method comprising the steps of:
providing a vending machine system including a hopper configured to hold a stack of the stackable goods, the hopper having an aperture formed in a base of the hopper for dispensing the stackable goods from the hopper, a vacuum generator, a reciprocating arm disposed adjacent the aperture, the reciprocating arm linearly movable between a retracted position and an extended position, one of the stackable goods received by the reciprocating arm when the reciprocating arm is in the retracted position and pushed from the stack of stackable goods by the reciprocating arm when the reciprocating arm is moved to the extended position, and a pair of holding members disposed on the hopper, one of the holding members disposed adjacent a first side of the reciprocating arm and another of the holding members disposed adjacent a second side of the reciprocating arm, the first side of the reciprocating arm disposed opposite the second side of the reciprocating arm, the holding members each extending over a minor portion of the aperture formed in the base of the hopper, the holding members permitting one of the stackable goods to be linearly dispensed from the hopper and militating against a pulling of the one of the stackable goods back through the aperture as the reciprocating arm retracts, wherein the reciprocating arm includes a base plate and a pusher plate, the base plate having an uppermost major surface, the major surface having a first portion and a second portion, the pusher plate covering and abutting the second portion of the major surface, the first portion of the major surface configured to receive the one of the stackable goods when the reciprocating arm is in the retracted position, and the pusher plate configured to push the one of the stackable goods from the stack of stackable goods when the reciprocating arm is moved to the extended position, wherein the base plate has an internal conduit in communication with at least one suction hole of the base plate, the at least one suction hole formed in the base plate in only the first portion of the major surface the pusher plate disposed above the internal conduit, and wherein the vacuum generator is in communication with the first portion of the major surface of the base plate via the internal conduit and the at least one suction hole and configured to create a vacuum at the first portion of the major surface of the base plate; and moving the reciprocating arm from the retracted position to the extended position to dispense the one of the stackable goods.

12. The method of claim 11, further comprising a step of creating the vacuum prior to the moving of the reciprocating arm from the retracted position.

13. The method of claim 12, further comprising a step of ceasing the vacuum after the reciprocating arm has been moved to the extended position.

14. The method of claim 11, wherein the vending machine system further includes a gear motor for moving the reciprocating arm between the retracted position and the extended position, the gear motor connected to the reciprocating arm via a first elongate member and a second elongate member, wherein the first elongate member is directly connected to an axle of the gear motor and rotatably connected to one end of the second elongate member, and another end of the second elongate member is rotatably connected to the reciprocating arm.

* * * * *